(12) United States Patent
Mao et al.

(10) Patent No.: US 9,331,586 B2
(45) Date of Patent: May 3, 2016

(54) SAMPLING FOR DIMMER EDGE DETECTION IN POWER CONVERTER

(71) Applicant: Power Integrations, Inc., San Jose, CA (US)

(72) Inventors: Mingming Mao, Saratoga, CA (US); Tiziano Pastore, Los Gatos, CA (US); Ricardo Luis Janezic Pregitzer, Campbell, CA (US); Peter Vaughan, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 249 days.

(21) Appl. No.: 14/253,190

(22) Filed: Apr. 15, 2014

(65) Prior Publication Data

US 2015/0295500 A1  Oct. 15, 2015

(51) Int. Cl.
| | |
|---|---|
| *H02M 3/335* | (2006.01) |
| *H05B 33/08* | (2006.01) |
| *H02M 1/08* | (2006.01) |
| *H02M 1/42* | (2007.01) |
| *H02M 5/257* | (2006.01) |

(52) U.S. Cl.
CPC ....... *H02M 3/33515* (2013.01); *H05B 33/0815* (2013.01); *H02M 1/081* (2013.01); *H02M 1/4258* (2013.01); *H02M 5/257* (2013.01); *Y02B 70/126* (2013.01)

(58) Field of Classification Search
CPC ............ H02M 3/335; H02M 3/33507; H02M 3/33515; H02M 3/33523; H02M 3/33538; H02M 3/33546; H02M 3/33553
See application file for complete search history.

(56) References Cited

U.S. PATENT DOCUMENTS

| | | | | |
|---|---|---|---|---|
| 2008/0084723 | A1* | 4/2008 | Balakrishnan ........ | H02M 3/335 363/97 |
| 2012/0091945 | A1* | 4/2012 | Chen ....................... | H02J 7/345 320/107 |
| 2013/0278159 | A1* | 10/2013 | Del Carmen, Jr. . | H05B 33/0809 315/200 R |

* cited by examiner

*Primary Examiner* — Jeffrey Gblende
(74) *Attorney, Agent, or Firm* — Blakely Sokoloff Taylor & Zafman LLP

(57) ABSTRACT

A controller and a method for controlling a power converter includes a sample block coupled to generate a first, second, and third sample by sampling an input sense signal that is representative of an input voltage of the power converter. An enable signal is asserted when a first difference between the first sample and the second sample exceeds a first threshold. An edge signal is asserted when both the enable signal is asserted and a second difference between the first sample and the third sample exceeds a second threshold. A drive circuit is coupled to output a drive signal in response to the edge signal. The drive signal is for controlling a switch coupled to regulate an output of the power converter.

20 Claims, 5 Drawing Sheets

SAMPLING FOR DIMMER EDGE DETECTION IN POWER CONVERTER

BACKGROUND INFORMATION

1. Field of the Disclosure

The present invention relates generally to power converters, and more specifically to power converters utilized with dimmer circuits.

2. Background

Residential and commercial lighting applications often include triac dimmers. A triac dimmer circuit typically disconnects a portion of an ac input voltage to limit the amount of voltage and current supplied to an incandescent lamp. This is known as phase dimming because it is often convenient to designate the position of the triac dimmer circuit and the resultant amount of missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the triac dimmer circuit disconnects. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees. On the other hand, the conduction angle is a measure of how many degrees (from a reference of zero degrees) of each half line cycle the triac dimmer circuit does not disconnect a portion of the ac input voltage. Or in other words, the conduction angle is a measure of how many degrees of each half line cycle in which the triac dimmer circuit is conducting. In one example, the removal of a quarter of the ac input voltage in a half line cycle may correspond to a phase angle of 45 degrees but a conduction angle of 135 degrees.

Although phase angle dimming works well with incandescent lamps that receive the altered ac input voltage directly, it typically creates problems for light emitting diode (LED) lamps. LED lamps often require a regulated power converter to provide regulated current and voltage from the ac power line. Most LEDs and LED modules are best driven by a regulated current which a regulated power converter may provide from an ac power line. Triac dimmer circuits typically don't work well with conventional regulated power converter controllers and consequently may cause flickering or shimmering of the LED lamp with large conduction angles and flashing of the LED lamp at low conduction angles.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
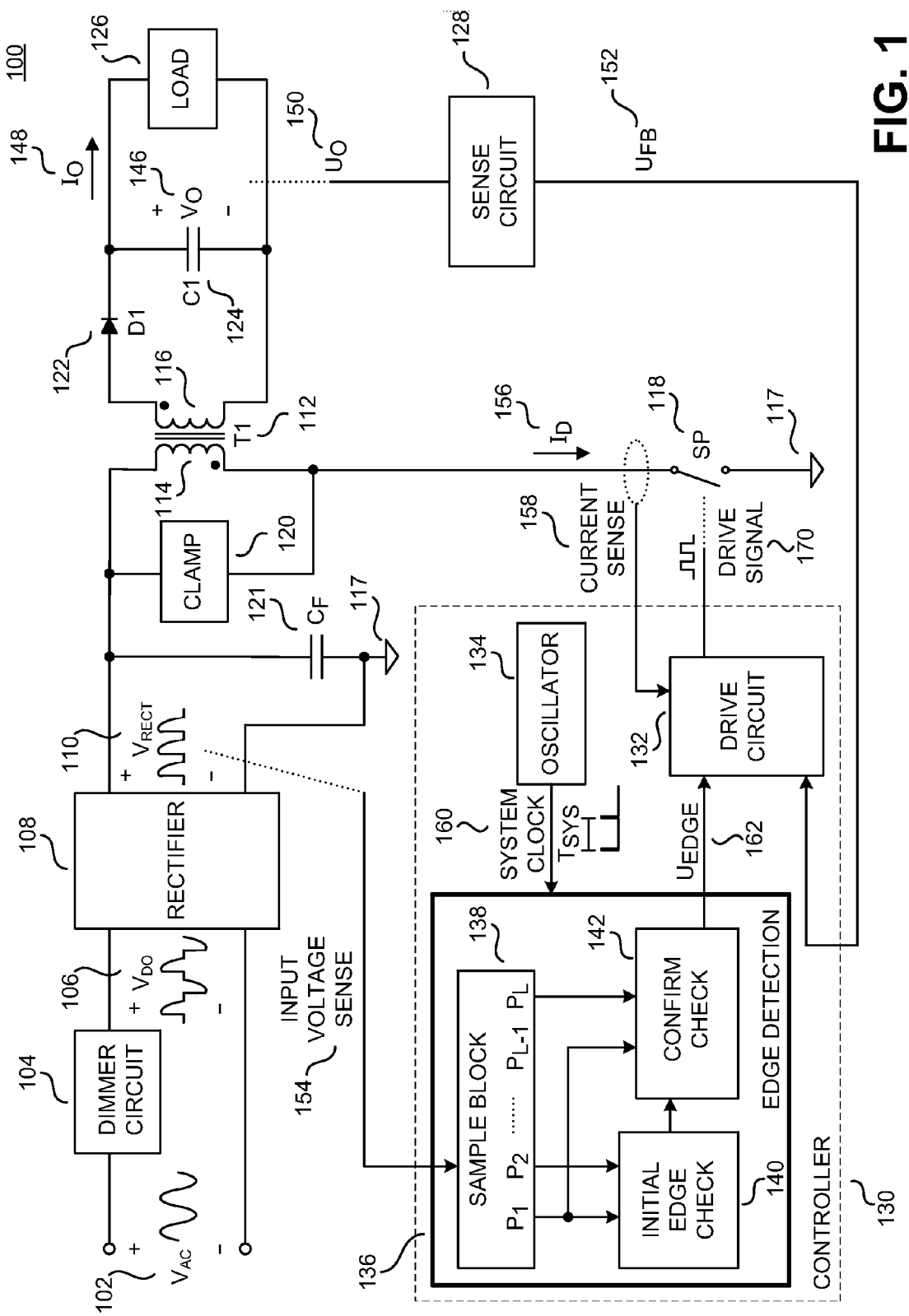
FIG. 1 is a functional block diagram illustrating an example power converter with a dimmer circuit utilizing a controller in accordance with an example of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

For phase dimming applications, including those for light emitting diodes (LED), a phase dimmer circuit typically disconnects a portion of the ac input voltage at every half line cycle to limit the amount of voltage and current supplied to the LEDs. Typically the phase angle is a measure of how many degrees of each half line cycle the dimmer circuit has disconnected the input. Alternatively, the amount of the ac input voltage which the dimmer circuit does not disconnect may be referred to as the conduction angle. In one example, the conduction angle (or phase angle) may be measured by threshold detection where the input voltage may be compared to a reference threshold. The amount of time which the input voltage is above a reference threshold may correspond to the conduction angle of the dimmer circuit. Alternatively, the amount of time which the input voltage is below the reference may correspond to the phase angle. However, measuring the conduction angle (or phase angle) utilizing threshold detection may be inaccurate due to leakage current of the triac in its off-state that prevents voltage across the power converter input capacitors to fall to substantially zero.

However, as will be illustrated, when a dimmer circuit is utilized, an "edge" may be observed in the waveform of input voltage of the power supply. For a leading edge dimmer circuit, in general, the input voltage is substantially zero until the dimmer circuit conducts and the input voltage rapidly increases and follows the ac input voltage. For a trailing edge dimmer circuit, the input voltage substantially follows the ac input voltage until the dimmer circuit does not conduct and the input voltage rapidly decreases to substantially zero. The rapid increase or decrease may referred to as an edge.

In one example of the present invention, an edge detection circuit may be utilized to determine if the dimmer circuit is or is not conducting. Once an edge is detected, the conduction angle (or phase angle) may be measured. For examples of the present invention, the edge detection circuit may sample the input of the power converter over multiple clock cycles. The edge detection circuit may compare consecutive samples (referred to as an initial sample and a next sample) and if the difference between the consecutive samples is greater than a first threshold, an edge may be present. Once an edge is initially detected, the edge detection circuit compares the initial sample of the input with a sample several clock cycles later. If the difference between the initial sample and the sample several clock cycles later is greater than a second threshold, then the edge is confirmed.

Referring first to FIG. 1, a functional block diagram of an example power converter 100 is illustrated including ac input voltage $V_{AC}$ 102, a dimmer circuit 104, a dimmer output voltage $V_{DO}$ 106, a rectifier 108, a rectified voltage $V_{RECT}$ 110, an energy transfer element T1 112, a primary winding 114 of the energy transfer element T1 112, a secondary winding 116 of the energy transfer element T1 112, a switch SP 118, input return 117, a clamp circuit 120, a rectifier D1 122, an input capacitor $C_F$ 121, an output capacitor C1 124, a load 126, a sense circuit 128, and a controller 130. Controller 130 further includes a drive circuit block 132, an oscillator 134, and an edge detection circuit 136. Edge detection circuit 136 is shown as including a sample block 138, an initial edge check circuit 140, and a confirm edge check circuit 142. In one example, sense circuit 128 may also be included in controller 130. FIG. 1 further illustrates an output voltage $V_O$ 146, an output current $I_O$ 148, an output quantity $U_O$ 150, a feedback signal $U_{FB}$ 152, a voltage sense signal 154, a switch current $I_D$ 156, a current sense signal 158, a system clock 160, an edge signal $U_{EDGE}$ 162 and a drive signal 170. The example switched mode power converter 100 illustrated in FIG. 1 is coupled in a flyback configuration, which is just one example of a switched mode power converter that may benefit from the teachings of the present invention. It is appreciated that other known topologies and configurations of switched mode power converter may also benefit from the teachings of the present invention. In addition, the example power converter in FIG. 1 is an isolated power converter. It should be appreciated that non-isolated power converters may also benefit from the teachings of the present invention.

The power converter 100 provides output power to the load 126 from an unregulated input voltage. In one embodiment, the input voltage is the ac input voltage $V_{AC}$ 102. In another embodiment, the input voltage is a rectified ac input voltage such as rectified voltage $V_{RECT}$ 110. As shown, dimmer circuit 104 receives an ac input voltage $V_{AC}$ 102 and produces the dimmer output voltage $V_{DO}$ 106. The dimmer circuit 104 may be utilized to limit the voltage delivered to the power converter 100. In one embodiment, the dimmer circuit 104 may be a phase dimming circuit such as a triac phase dimmer. The dimmer circuit 104 further couples to the rectifier 108 and the dimmer output voltage $V_{DO}$ 106 is received by the rectifier 108.

The rectifier 108 outputs rectified voltage $V_{RECT}$ 110. In one embodiment, rectifier 108 may be a bridge rectifier. The rectifier 108 further couples to the energy transfer element T1 112. In some embodiments of the present invention, the energy transfer element T1 112 may be a coupled inductor, a transformer, or an inductor. In the example of FIG. 1, the energy transfer element T1 112 includes two windings, a primary winding 114 and a secondary winding 116. However, it should be appreciated that the energy transfer element T1 112 may have more than two windings. In the example of FIG. 1, primary winding 114 may be considered an input winding, and secondary winding 116 may be considered an output winding. The primary winding 114 is further coupled to switch SP 118, which is then further coupled to input return 117.

In addition, the clamp circuit 120 is illustrated in the example of FIG. 1 as being coupled across the primary winding 114 of the energy transfer element T1 112. An output is provided to the load 126 and may be provided as either a regulated output voltage $V_O$ 146, regulated output current $I_O$ 148, or a combination of the two. In one embodiment, the load 126 may be a light emitting diode (LED), an LED module or an LED array.

The power converter 100 further comprises circuitry to regulate the output which is exemplified as output quantity $U_O$ 150. In general, the output quantity $U_O$ 150 is either an output voltage $V_O$ 146, an output current $T_O$ 148, or a combination of the two. A sense circuit 128 is coupled to sense the output quantity $U_O$ 150 and to provide feedback signal $U_{FB}$ 152, which is representative of the output quantity $U_O$ 150. Feedback signal $U_{FB}$ 152 may be voltage signal or a current signal. In examples, the sense circuit 128 may directly or indirectly (via an additional winding of the energy transfer element) sense the output. Controller 130 is coupled to the sense circuit 128 and receives the feedback signal $U_{FB}$ 152 from the sense circuit 128. The controller 130 further includes terminals for receiving the voltage sense signal 154, current sense signal 158 and for providing the drive signal 170 to power switch SP 118. In the example of FIG. 1, the voltage sense signal 154 may be representative of the rectified voltage $V_{RECT}$ 110. However, in other examples the voltage sense signal 154 may be representative of the dimmer output voltage $V_{DO}$ 106. The voltage sense signal 158 may be a voltage signal or a current signal. The current sense signal 158 may be representative of the switch current $I_D$ 156 in the power switch SP 118. Current sense signal 158 may be a voltage signal or a current signal. Controller 130 receives the current sense input signal 158 which relays the switch current $I_D$ 156 in the switch SP 118. The switch current $I_D$ 156 may be sensed in a variety of ways, such as for example the voltage across a discrete resistor or the voltage across a transistor when the transistor is conducting.

Controller 130 provides drive signal 170 to the power switch SP 118 to control various switching parameters to control the transfer of energy from the input of power converter 100 to the output of power converter 100. Examples of such parameters may include switching frequency, switching period, duty cycle, respective ON and OFF times of the power switch SP 118, or varying the number of pulses per unit time of the power switch SP 118.

As illustrated in the example of FIG. 1, the controller 130 includes the drive circuit 132, oscillator 134, and the edge detection circuit 136. The drive circuit is coupled to output the drive signal 170 to control switching of the power switch SP 116 in response to the edge signal $U_{EDGE}$ 162 and/or the feedback signal $U_{FB}$ 152. In addition, the drive circuit may also be coupled to be responsive to the current sense signal 158. Although a single controller is illustrated in FIG. 1, it should be appreciated that multiple controllers may be utilized by the power converter 100. In addition, the drive circuit 132, oscillator 134, and edge detection circuit 136 need not be within a single controller. For example, the power converter 100 may have a primary controller and a secondary controller coupled to the input side and the output side, respectively, of the power converter 100.

In the example illustrated, the edge detection circuit 136 includes the sample block 138, the initial edge check circuit 140, and the confirm edge check circuit 142. Edge detection circuit 136 is coupled to receive the voltage sense signal 154 and the system clock 160 and output the edge signal $U_{EDGE}$ 162. The edge signal $U_{EDGE}$ 162 may provide information that an edge has been detected in the input voltage provided by the voltage sense signal 154. The edge signal $U_{EDGE}$ 162 may be a rectangular pulse waveform with varying lengths of logic high and logic low sections. In one example, the edge signal $U_{EDGE}$ 162 may be logic high if an edge is detected and logic low if an edge is not detected. In another example, the edge signal $U_{EDGE}$ 162 may pulse (transition to a logic high value and quickly transition to a logic low value) when an edge is detected. Although not shown for clarity, sample block 138 may be coupled to receive the system clock 160.

Sample block 138 is coupled to receive and sample the voltage sense signal 154. In addition, the sample block 138 may store L number of samples of the voltage sense signal. As illustrated, the samples of the voltage sense signal 154 may be stored in positions P1, P2, to PL. In one example, the sample block 138 samples and stores the voltage sense signal 154 in response to the system clock 160.

Initial edge check block 140 is coupled to receive the samples of the voltage sense signal 154 stored in positions P1 (first sample terminal) and P2 (second sample terminal) of the sample block 138. In one example, the samples stored in positions P1 and P2 represent consecutive samples of the input voltage sense signal 154. In other words, a first sample stored in P2 was sampled immediately preceding a second sample stored in P1. Or in another example, the samples stored in positions P1 and P2 may be not necessarily be consecutive. As will be discussed further, the initial edge check block 140 compares the samples in position P1 and P2 and outputs a signal to the confirm check block 142. If the difference between the samples in position P1 and P2 is large enough, the initial edge check block 140 outputs an enable signal to the confirm check block 142.

Confirm check block 142 is coupled to receive the samples stored at P1 and PL (third sample terminal) of the sample block 138 and the output of the initial edge check block 140. In response to the output of the initial edge check block 140, the confirm check block 142 compares the samples stored at P1 and PL of the sample block 138. In one example, samples P1 and PL may represent the oldest sample (PL) and the most-recent sample (P1). The confirm check block 142 outputs the edge signal $U_{EDGE}$ 162 in response to the comparison between the oldest sample (PL) and the most-recent sample (P1). If the difference between the samples in position PL and P1 is large enough, the confirm edge check block 142 asserts that an edge is detected.

In operation, the power converter 100 of FIG. 1 provides output power to the load 126 from an unregulated input such as the ac input voltage $V_{AC}$ 102. For the example of a LED load, when the dimmer circuit 104 limits the amount of voltage delivered to the power converter, the resultant current delivered to the load of LED arrays is also limited and the LED array dims.

The dimmer circuit 104 produces the dimmer output voltage $V_{DO}$ 106 which is received by rectifier 108. The rectifier 108 produces the rectified voltage $V_{RECT}$ 110. The filter capacitor $C_F$ 121 filters the high frequency current from the switch SP 118. For other applications, the filter capacitor $C_F$ 121 may be large enough such that a substantially dc voltage is applied to the energy transfer element T1 112. However, for power supplies with power factor correction (PFC), a small filter capacitor $C_F$ 121 may be utilized to allow the voltage applied to the energy transfer element T1 112 to substantially follow the rectified voltage $V_{RECT}$ 110. As such, the value of the filter capacitor $C_F$ 121 may be chosen such that the voltage on the filter capacitor $C_F$ 121 reaches substantially zero during each half-line cycle of the ac input voltage $V_{AC}$ 102. Or in other words, the voltage on the filter capacitor $C_F$ 121 substantially follows the positive magnitude of the dimmer output voltage $V_{DO}$ 106. As such, the controller 130 may detect when the dimmer circuit 104 disconnects and reconnects the ac input voltage $V_{AC}$ 102 from the power converter 100 by sensing the voltage on the filter capacitor $C_F$ 121 (or in other words the rectified voltage $V_{RECT}$ 110). In another embodiment, the controller 130 may detect (approximately) when the dimmer circuit 104 disconnects and reconnects the ac input voltage $V_{AC}$ 102 from the power converter 100 by sensing the switch current $I_D$ 156.

The switching power converter 100 utilizes the energy transfer element T1 112 to transfer voltage between the primary 114 and the secondary 116 windings. Switch SP 118 is opened and closed in response to the drive signal 170. In one example, the switch SP 118 may be a transistor such as a metal-oxide-semiconductor field-effect transistor (MOSFET). In another example, controller 130 may be implemented as a monolithic integrated circuit or may be implemented with discrete electrical components or a combination of discrete and integrated components. Controller 130 and switch SP 118 could form part of an integrated circuit that is manufactured as either a hybrid or monolithic integrated circuit.

Controller 130 receives the voltage sense input signal 154 which relays the value of the rectified voltage $V_{RECT}$ 110. The rectified voltage $V_{RECT}$ 110 may be sensed a variety of ways, such as for example through a resistor divider. Edge detection circuit 136 is coupled to output the edge signal $U_{EDGE}$ 162 in response to the voltage sense signal 154 if an edge is detected. Edge signal $U_{EDGE}$ 162 may be analog or digital signals with a logic high value corresponding to an edge being detected and a logic low value corresponding to no edge detected. In another example, edge signal $U_{EDGE}$ 162 may pulse to a logic high value when an edge is detected. As will be further discussed, the sample block 138 samples L number of values of the input voltage sense signal 154. In one example, the L number of values is also stored by the sample block 138. Samples within the sample block 138 are compared by the initial edge check circuit 140. If the difference between consecutive samples is large enough, an edge may exist and the initial edge check block 140 sends an enable signal to the confirm check block 142 to confirm that an edge does exist. In the example shown, the samples stored in positions P1 and P2 of the sample block are compared. As will be further discussed, the enable signal from the initial edge check 140 is delayed until the sample initially stored in position P2 is stored in position PL. Once the confirm check block 142 is enabled, the confirm check block 142 compares the most-recent sample (P1) to the oldest sample (PL). If the difference between the most-recent sample and the oldest sample is large enough, an edge is detected.

Figure 2:
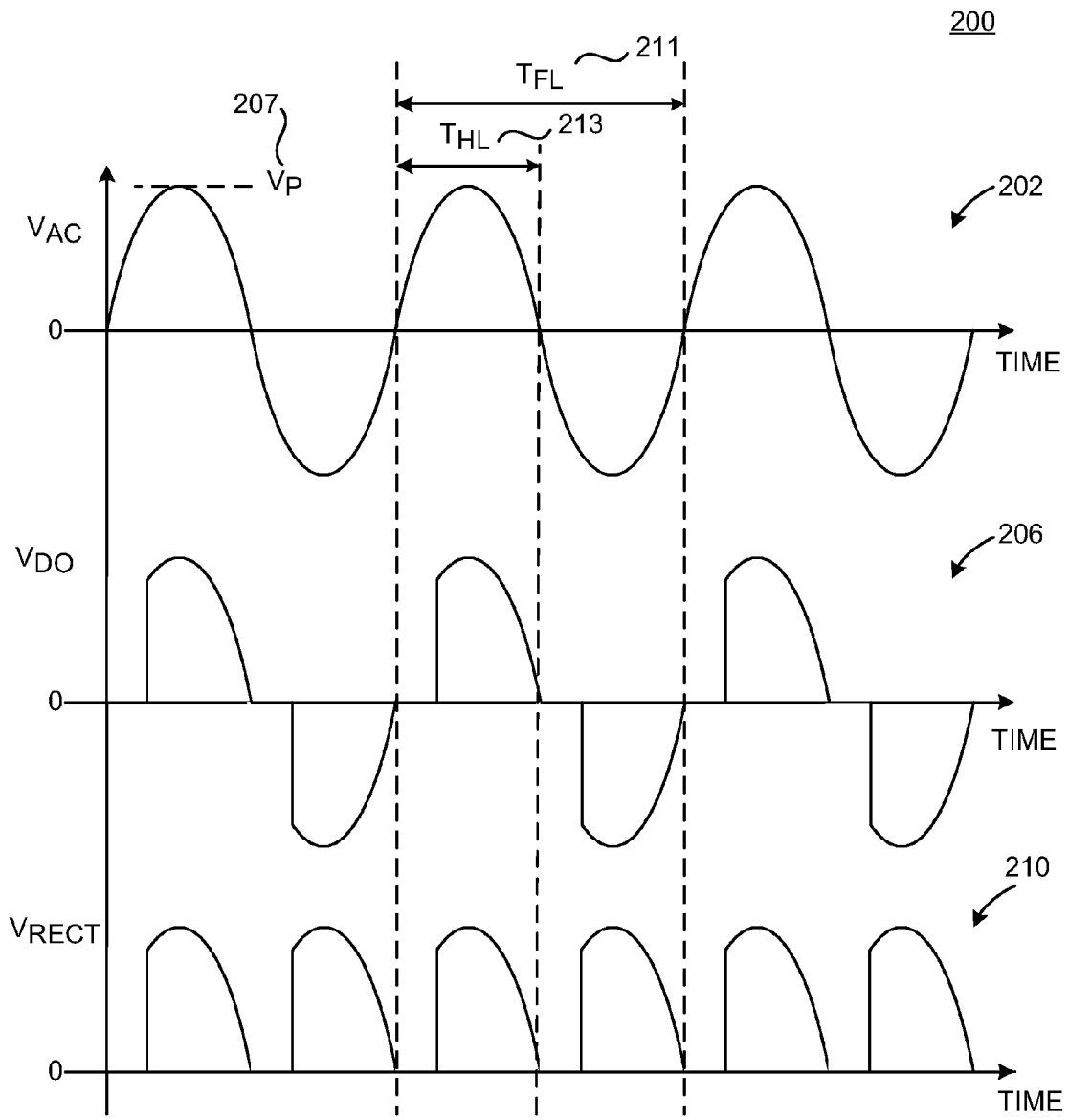
FIG. 2 is a diagram illustrating example waveforms of an ac input voltage, an output voltage of a dimmer circuit, and an output of a rectifier circuit of FIG. 1 in accordance with an example of the present invention.

FIG. 2 illustrates example waveforms of an ac input voltage 202, a dimmer output voltage $V_{DO}$ 206, and a rectified voltage $V_{RECT}$ 210. In particular, FIG. 2 illustrates the dimmer output voltage $V_{DO}$ 206 and a resultant rectified voltage $V_{RECT}$ 210 for leading edge triac dimming.

In general, the ac input voltage $V_{AC}$ 202 is a sinusoidal waveform with the period of the ac input voltage $V_{AC}$ 202 referred to as a full line cycle $T_{FL}$ 211. Mathematically: $V_{AC}=V_P \sin(2\pi f_L t)$. Where $V_P$ 207 is the peak voltage of the ac input voltage $V_{AC}$ and $f_L$ is the frequency of the ac input voltage. It should be appreciated that the full line cycle $T_{FL}$ 211 is the reciprocal of the line frequency $f_L$, or mathematically:

$$T_{FL} = \frac{1}{f_L}.$$

As shown in FIG. 2, a full line cycle $T_{FL}$ 211 of the ac input voltage 202 is denoted as the length of time between every other zero-crossing of the ac input voltage 202. Further, the half line cycle $T_{HL}$ 213 is the reciprocal of double the line frequency, or mathematically:

$$T_{HL} = \frac{1}{2f_L}.$$

As shown, the half line cycle $T_{HL}$ 213 of the ac input voltage $V_{AC}$ 202 is denoted as the length of time between consecutive zero-crossings.

For the example of FIG. 2, the beginning of each half line cycle $T_{HL}$ 213 of the rectified voltage $V_{RECT}$ 210 is substantially equal to zero voltage corresponding to when the dimmer circuit 104 disconnects the ac input voltage $V_{AC}$ 202 from the power converter. When the dimmer circuit 104 reconnects the ac input voltage $V_{AC}$ 102 to the power converter, the rectified voltage $V_{RECT}$ 210 substantially follows the positive magnitude of the dimmer output voltage $V_{DO}$ 206 and the ac input voltage $V_{AC}$ 202. As shown the dimmer output voltage $V_{DO}$ 206 sharply increases (or decreases) to substantially follow the ac input voltage $V_{AC}$ 202. The sharp increase is also illustrated in the example waveform of the rectified voltage $V_{RECT}$ 210. The sharp increase may be referred to as the "edge."

Figure 3:
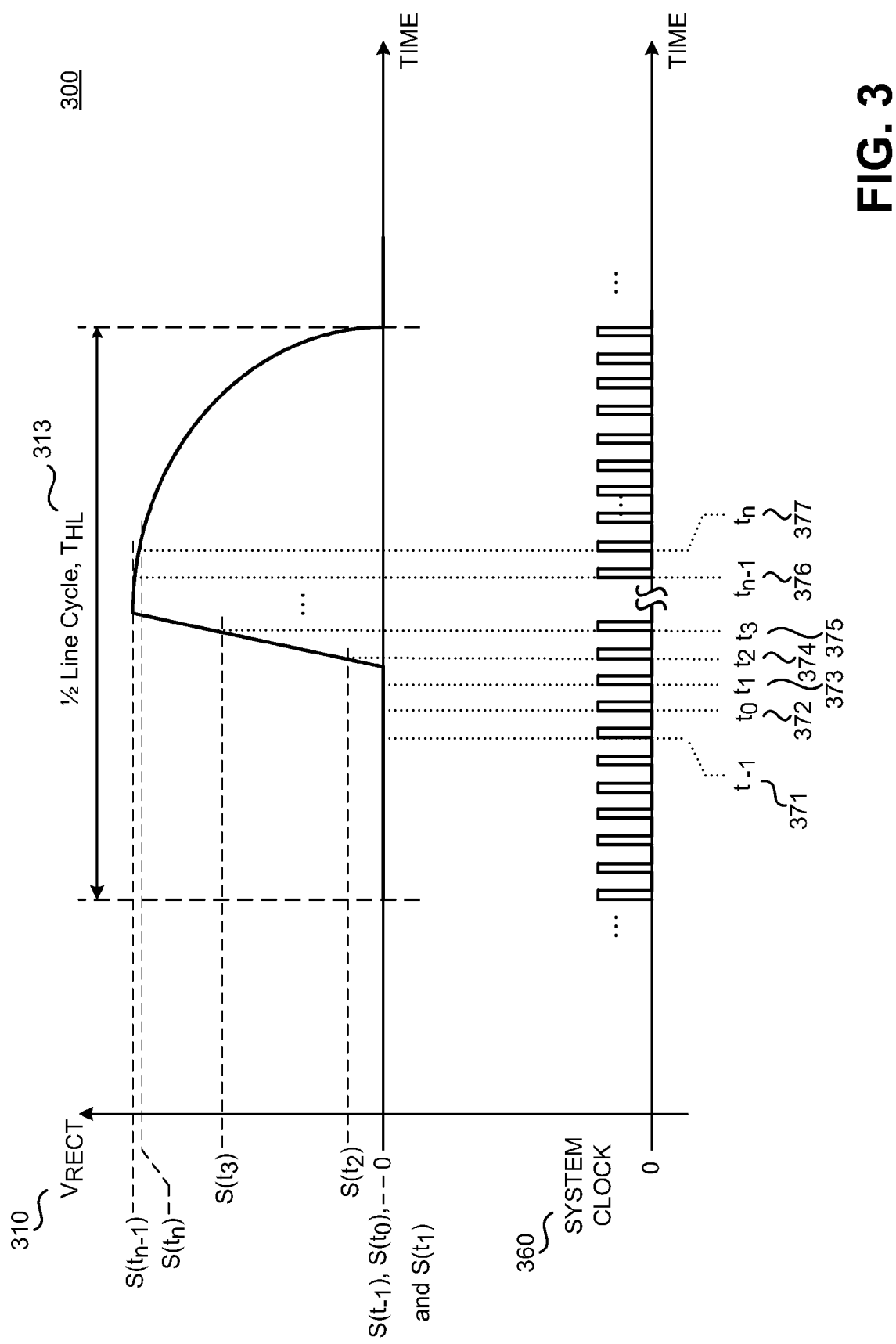
FIG. 3 is a diagram illustrating example waveforms of a rectified input, a system clock, and various samples of the rectified input of the power converter of FIG. 1 in accordance with an example of the present invention.

Referring next to FIG. 3, example waveforms of the rectified voltage $V_{RECT}$ 310 and the system clock 360 of the switching power converter 100 are illustrated including half line cycle $T_{HL}$ 313, times $t_{-1}$ 371, $t_0$ 372, $t_1$ 373, $t_2$ 374, $t_3$ 375, $t_{n-1}$ 376, and $t_n$ 377, and samples $S(t_{-1})$, $S(t_1)$, $S(t_1)$ $S(t_2)$ $S(t_3)$ $S(t_{n-1})$ and $S(t_n)$. It should be appreciated that only one half line cycle $T_{HL}$ 313 is illustrated for clarity.

FIG. 3 illustrates one half line cycle $T_{HL}$ 313 of the rectified voltage $V_{RECT}$ 310, and the system clock 360 when the dimmer circuit is disconnecting a portion of the ac input voltage $V_{AC}$ 102 from the power converter 100. In the example shown, the slope of the edge (the quick increase of the rectified voltage $V_{RECT}$ 310) is exaggerated to help illustrate examples of the invention. The system clock 360 is shown as a rectangular pulse waveform with logic high and logic low sections. In the example shown, the period of the system clock $T_{SYS}$ (in one example, the amount of time between leading edges) is shorter than the one half line cycle $T_{HL}$ 313.

Or in other words, the frequency of the system clock 360 is faster than the line frequency of the ac input voltage $V_{AC}$ 102. In one example the full line cycle $T_{FL}$ 311 is 4096 times greater than the system period $T_{SYS}$ of the system clock 360. In another example, the system clock 360 is 916 times faster than the line frequency.

At time $t_{-1}$ 371 and $t_0$ 372, the values of the rectified voltage $V_{RECT}$ 310 are substantially equal to zero and are denoted as samples $S(t_{-1})$ (i.e., the value of the sample at time $t_{-1}$) and $S(t_0)$ respectively. Similarly, at time $t_1$ 373 the sampled value of the rectified voltage $V_{RECT}$ 310 is substantially equal to zero and is denoted as sample $S(t_1)$. In examples of the present invention, consecutive samples are compared and if the difference between the values of the samples are great enough, the initial edge check block 140 may detect that an edge exists and sends a signal to the confirm check block 142 to confirm whether an edge exists. For the example shown, the differences between samples $S(t_0)$ and $S(t_{-1})$, and samples $S(t_1)$ and $S(t_0)$ are substantially equal to zero. As such, the initial edge check block 140 does not enable the confirm edge check block 142.

At time $t_2$ 374, the rectified voltage $V_{RECT}$ 310 is substantially non-zero and the sampled value is denoted as sample $S(t_2)$. As shown in FIG. 3, the rectified voltage $V_{RECT}$ 310 is substantially non zero at times $t_3$ 375, $t_{n-1}$ 376, and $t_n$ 377. The sampled values at these times are denoted as $S(t_3)$, $S(t_{n-1})$, and $S(t_n)$, respectively. In one example, the sample $S(t_2)$ is compared with the sample $S(t_1)$. If the difference between the sample $S(t_2)$ (outputted on first sample terminal P1) and the sample $S(t_1)$ (outputted on second sample terminal P2) is greater than a first threshold, the initial edge check block 140 indicates that an edge may exist and sends a signal to the confirm check block 142 to confirm whether an edge exists. The edge detection circuit 136 waits a given amount of time (or in other words, a given number of system clock 360 periods) and continues to sample the rectified voltage $V_{RECT}$ 310 (shown as samples $S(t_3)$, $S(t_{n-1})$, and $S(t_n)$). After the given amount of time, the edge detection circuit 136 (specifically the confirm edge check block 142) compares the most-recent sample (e.g. $S(t_n)$) outputted by first sample terminal P1 with the initial sample (e.g. $S(t_1)$) outputted for third sample terminal PL. If the difference between the most-recent sample $S(t_n)$ and the initial sample $S(t_1)$ is greater than a second threshold, the confirm edge check block 142 outputs the edge signal $U_{EDGE}$ 162 and asserts that an edge is detected.

Figure 4:
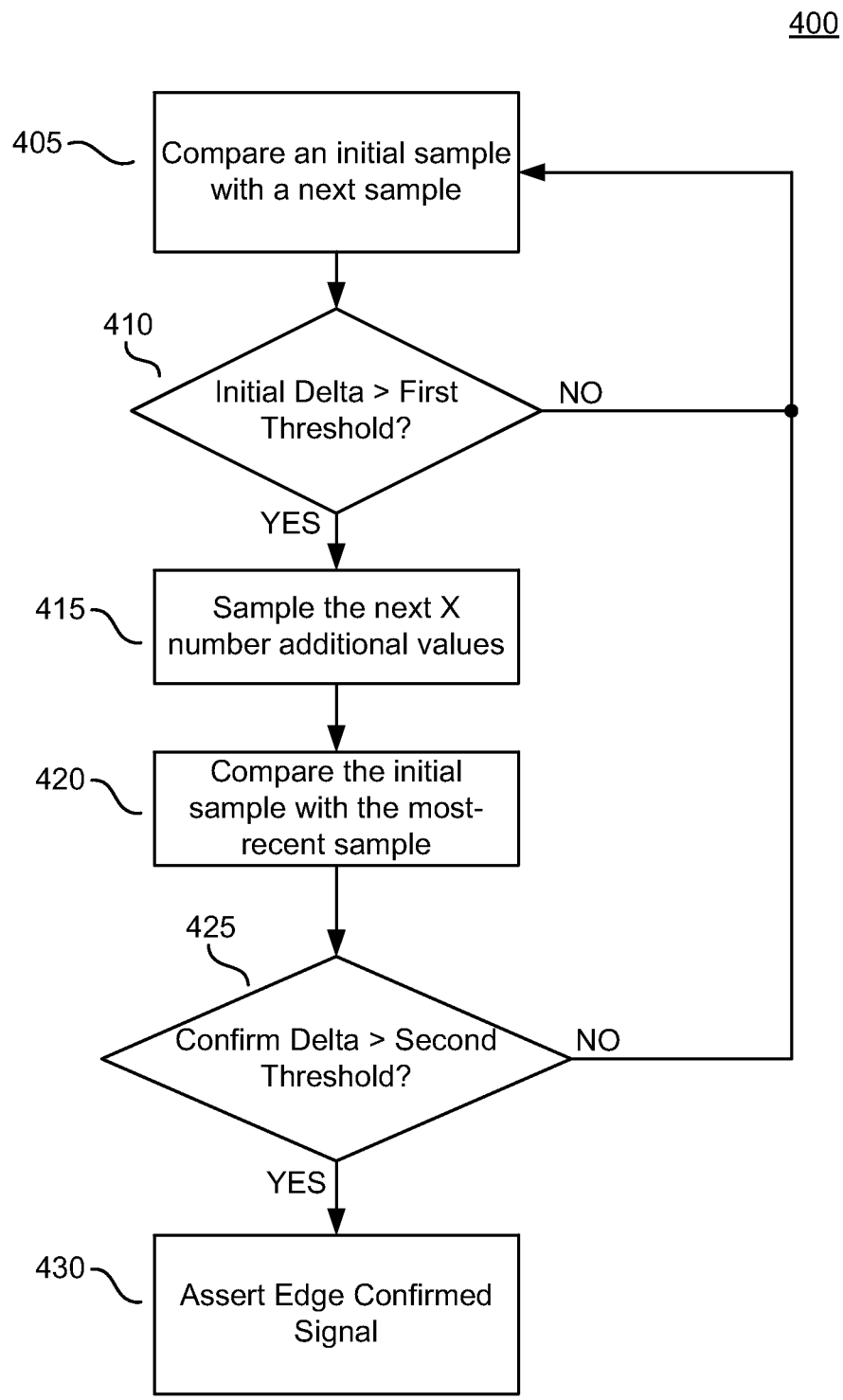
FIG. 4 is a flow diagram illustrating an example method for determining an edge in an input waveform in accordance with an example of the present invention.

FIG. 4 is a flow diagram illustrating an example process 400 for detecting an edge in an input waveform in accordance with an example of the present invention. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, an initial sample (e.g. sample $S(t_1)$) is compared with a next sample (e.g. sample $(St_2)$), at a first time period. In block 410, the process determines whether the initial delta (i.e. the difference between the sample $S(t_1)$ and the sample $(St_2)$) is greater than the first threshold. If the difference is not greater than the first threshold, the process returns to block 405 and another initial sample is compared with the next sample. However, the samples compared would be the next set of consecutive samples (i.e. sample $S(t_2)$ and $S(t_3)$ for this particular example).

If the difference is greater than the first threshold, the process moves onto block 415 where the next X number of additional values are sampled. In one example, the number X may be the total number of values (e.g. five samples) which may be sampled and stored minus 2. For the example of FIG. 1, X could be L-2 with L being the number of sampled values stored by sample block 138.

At process block 420, the initial sample (e.g. sample $S(t_1)$) is compared with the most-recent sample (e.g. sample $S(t_n)$) at a second time period subsequent to the first time period associated with process block 405 and after the X number of additional values are sampled. In other words, the oldest sample (e.g. initial sample $S(t_1)$) held by sample block 138 is compared to the most-recent sample held by the sample block 138. In block 425, the process determines whether the confirm delta (i.e. the difference between the sample $S(t_1)$ and the sample $(St_n)$) is greater than the second threshold. If the difference is not greater than the second threshold, the process returns to block 405 and another initial sample is compared with the next sample. However, the samples compared would be the next set of consecutive samples (i.e. sample $S(t_n)$ and $S(t_{n+1})$ for this particular example). If the difference is greater than the second threshold, the process moves onto block 430 and the edge signal confirms that an edge has been detected.

Figure 5:
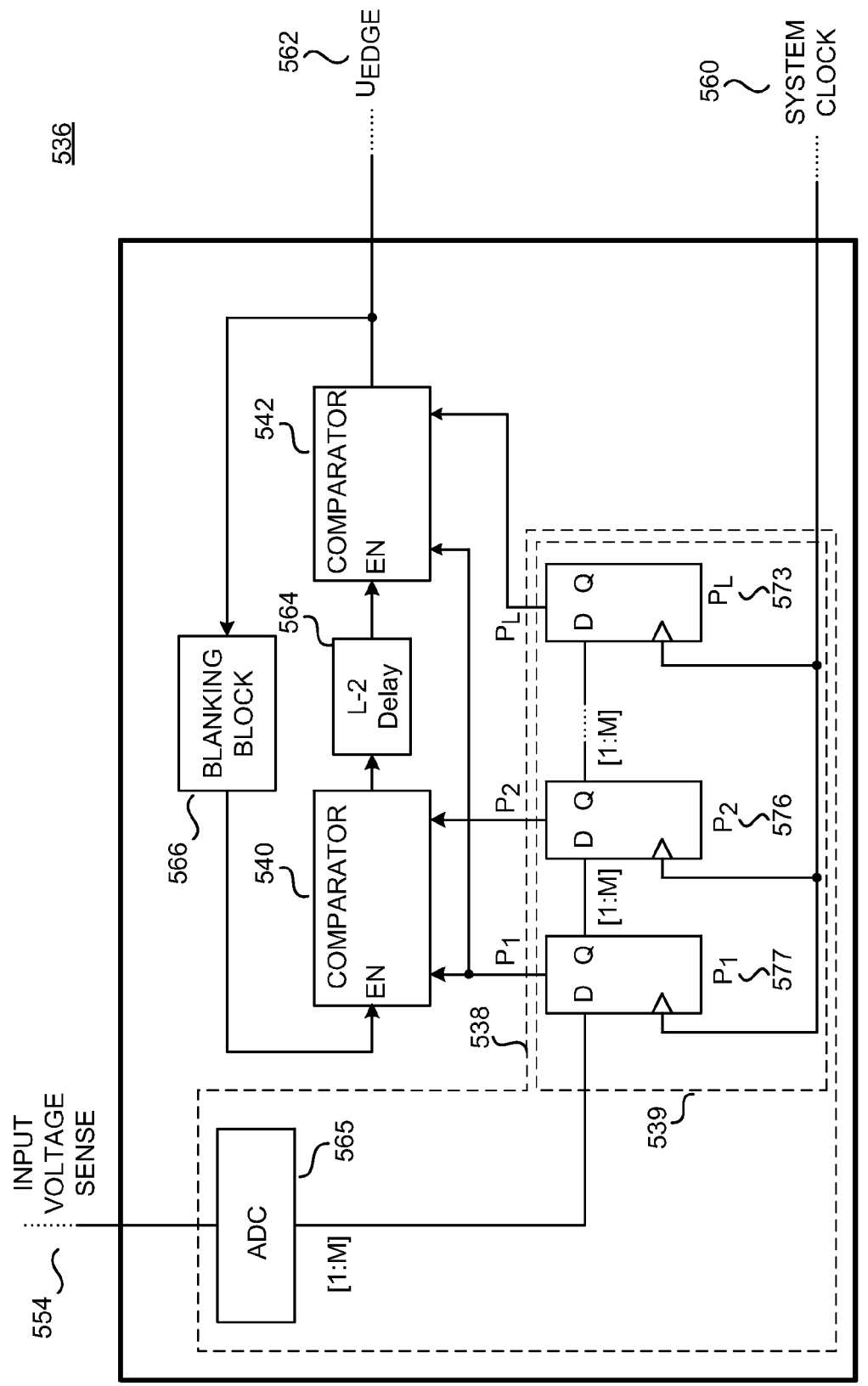
FIG. 5 is a function block diagram of an edge detection circuit of the controller for FIG. 1 in accordance with an example of the present invention.

FIG. 5 illustrates an example edge detection circuit 536 including sample block 538, initial edge check block 540, confirm edge check block 542, and a delay block 564. The edge detection circuit 536 may also optionally include a blanking block 566. Sample block 538 includes an M-bit analog to digital converter (ADC) 565 and a cascaded shift register 539 including registers P1 577, P2 576, and PL 573.

In one example, input voltage sense signal 554 may be a voltage signal or a current signal. The ADC 565 is coupled to receive the input voltage sense signal 554 and converts the input voltage sense signal 554 to an M-bit digital signal. Register P1 577 is coupled to receive digital input voltage sense signal 554 from the ADC 565. For the example of FIG. 5, cascaded shift register 539 is exemplified as a shift register of L length. As such, cascaded shift register 539 includes L number of registers (shown as P1 577, P2 576, and PL 573). In one example, L is the integer five. The output of (front) register P1 577 is coupled to be received at the input of register P2 576 and so on. As illustrated, the registers are M-bit registers. Cascaded shift register 538 is coupled to sample and hold L number of samples of the input voltage sense signal 554. Each individual register is also coupled to receive the system clock 560 at their clock input. As illustrated, each individual register P1 577, P2 576, and PL 573 updates in response to the system clock 560. It is understood that a sample stored in P1 577 will move down the registers toward (rear) register PL 573 at each system clock. Although L number of registers are illustrated, it should be appreciated that two registers may be utilized to sample and store the input voltage sense signal 554. When utilizing two register, both registers may be updated in response to the system clock 560 until the difference between the samples is greater than the first threshold. Then the oldest sampled value may be stored in one register while the other register is updated over a given amount of time then the latest value stored on the other register may be compared to the oldest sampled value to determine if an edge has been detected.

Comparator 540 is coupled to receive the samples stored in register P1 577 and register P2 576. The output of comparator 540 is coupled to be received by the delay block 564. As illustrated, the comparator 542 is coupled to receive the output of delay block 564 at the enable EN input and is also coupled to receive the samples stored in register P1 577 and register PL 573. The output of comparator 542 is the edge signal $U_{EDGE}$ 562. Further, the blanking block 566 is coupled to receive the output of comparator 542. The output of the blanking block 566 is received at the enable input of the comparator 540.

In operation, registers P1 577, P2 576 and PL 573 sample and store L number of samples of the input voltage sense signal 554. The sample stored in register P1 577 may be the most-recent sample of the input voltage sense signal 554 while the sample stored in register PL 573 is the oldest stored sample of the input voltage sense signal 554. Comparator 540 is coupled to compare the samples stored in register P1 577 and register P2 576. If the difference between the samples stored in register P1 577 and register P2 576 is greater than a first threshold at a first time, the comparator 540 outputs a signal to enable the comparator 542 to compare the samples stored in register P1 577 and register PL 573. However, delay block 564 delays or extends the output of comparator 540 by L-2 system clocks 560 cycles. As such, the sample originally stored in register P2 576 is now stored in register PL 573 and the sample stored in register P1 577 would be stored in register PL-1 (not shown). Once enabled, the comparator 542 compares the samples stored in register P1 577 and register PL 573 at a second time. It is understood that the sample (e.g. initial sample $S(t_1)$) stored in register P2 576 at the first time period will now be stored in register PL 573 during the second time period. If the difference between the samples stored in register P1 577 and register PL 573 (at the second time period) is greater than the second threshold, the edge signal $U_{EDGE}$ 562 asserts that an edge has been detected. In one example, the edge signal $U_{EDGE}$ 562 transitions to a logic high value when an edge is detected. The blanking block 566 generally outputs a logic high value to enable the comparator 540. However, when an edge is detected and the output of the comparator 542 is logic high, the blanking block 566 outputs a logic low value for a fixed period of time to disable the comparator 540 from comparing its inputs. Disabling the comparator prevents edge detection circuit 536 from reasserting edge signal $U_{EDGE}$ 562 in response to the same edge that it just detected.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for a power converter, the controller comprising:
    an edge detection circuit including:
        a sample block coupled to generate a first, second, and third sample by sampling an input sense signal that is representative of an input voltage of the power converter, the first sample generated prior to the second sample and the second sample generated prior to the third sample;
        an initial edge check module coupled to receive the first sample and the second sample, wherein the initial edge check module includes a comparator coupled to assert an enable signal when a first difference between the first sample and the second sample exceeds a first threshold; and a confirm check module coupled to compare the third sample to the first sample and coupled to receive the enable signal from the comparator, wherein the confirm check module outputs an edge signal when both the enable signal is asserted and a second difference between the first sample and the third sample exceeds a second threshold; and a drive circuit coupled to output a drive signal in response to the edge signal, wherein the drive signal is for controlling a switch coupled to regulate an output of the power converter.

2. The controller of claim 1, wherein the first sample was sampled immediately preceding the second sample.

3. The controller of claim 1, wherein the sample block is configured to generate additional samples between the second sample and the third sample.

4. The controller of claim 3 further comprising a delay circuit coupled between the initial edge check module and the confirm check module, wherein the delay circuit is coupled to hold the enable signal asserted while the sample block generates the third sample and the additional samples.

5. The controller of claim 3, wherein the sample block is configured to store L number of samples of the input sense signal, L being substantially equal to a total number of the first, second, third, and additional samples.

6. The controller of claim 1 further comprising a blanking block coupled between the initial edge check module and the confirm check module, the blanking block configured to disable the initial edge check module from comparing the first sample and the second sample for a fixed period of time after the edge signal is asserted by the confirm check module.

7. The controller of claim 1, wherein the sample block includes a first sample terminal, a second sample terminal, and a third sample terminal, and wherein the first sample terminal outputs the second sample and the second sample terminal outputs the first sample to the initial edge check module at a first time period, and further wherein the first sample terminal outputs the third sample and the third sample terminal outputs the first sample to the confirm check module at a second time period subsequent to the first time period.

8. The controller of claim 1, wherein the sample block includes:

an analog-to-digital converter ("ADC") coupled to receive the input sense signal and coupled to convert the input sense signal into a digital signal; and cascaded shift registers for storing the first, second, and third samples, a front register of the cascaded shift registers coupled to receive the digital signal and a rear register of the cascaded shift registers coupled to the confirm check module.

9. A method of operating a controller of a power converter, the method comprising:

generating an initial sample of an input sense signal that is representative of an input voltage of the power converter;

generating a next sample of the input sense signal subsequent to generating the initial sample;

asserting an enable signal when a first difference between the initial sample and the next sample exceeds a first threshold;

generating a most-recent sample of the input sense signal subsequent to generating the next sample;

generating an edge confirmation signal when both the enable signal is asserted and a second difference between the most-recent sample and the initial sample exceeds a second threshold, wherein a switch coupled to regulate an output of the power converter is responsive to the edge confirmation signal.

10. The method of claim 9, wherein additional samples are generated between the next sample and the most-recent sample.

11. The method of claim 10, wherein the enable signal is held asserted while the additional samples and the most-recent sample are generated.

12. The method of claim 9 further comprising:

delaying a subsequent assertion of the enable signal for a delay period after the edge confirmation signal is generated.

13. The method of claim 9, wherein outputting the edge confirmation signal indicates that an edge of a dimmer signal is present.

14. A switched mode power converter comprising:

a switch;

an energy transfer element coupled to the switch and coupled to receive an input sense signal; and a controller coupled to the switch to regulate an output of the switched mode power converter in response to a dimming signal, wherein the controller includes:

an edge detection circuit including:

a sample block coupled to sample an input sense signal that is representative of the dimming signal, wherein the sample block includes a first sample output, a second sample output, and a last sample output;

an initial edge check module coupled to the first and second sample outputs and coupled to assert an enable signal in response to receiving a next sample from the first sample output and receiving an initial sample from the second sample output at a first time, wherein the next sample was generated by sampling the input sense signal subsequent to generating the initial sample by sampling the input sense signal; and a confirm check module coupled to the first and third sample outputs and coupled to receive a most-recent sample from the first sample output and the initial sample from the last sample output at a second time following the first time, the confirm check module coupled to output an edge signal when both the enable signal is asserted and a difference between the most-recent sample and the initial sample exceeds a threshold; and a drive circuit coupled to output a drive signal in response to the edge signal, wherein the drive signal is for controlling the switch.

15. The switched mode power converter of claim 14, wherein the initial sample was sampled immediately preceding the next sample.

16. The switched mode power converter of claim 14, wherein the sample block is configured to generate additional samples between the most-recent sample and the next sample.

17. The switched mode power converter of claim 16 further comprising a delay circuit coupled between the initial edge check module and the confirm check module, wherein the delay circuit is coupled to hold the enable signal asserted while the sample block generates the most-recent sample and the additional samples.

18. The switched mode power converter of claim 14, wherein the sample block is configured to store L number of samples of the input sense signal, L being substantially equal to a total number of the initial, next, most-recent, and additional samples.

19. The switched mode power converter of claim 14 further comprising a blanking block coupled between the initial edge check module and the confirm check module, the blanking block configured to disable the initial edge check module from asserting the enable signal for a fixed period of time after the edge signal is outputted by the confirm check module.

20. The switched mode power converter of claim 14, wherein the sample block includes:
- an analog-to-digital converter ("ADC") coupled to receive the input sense signal and coupled to convert the input sense signal into a digital signal; and
- cascaded shift registers for storing the initial, next, and most-recent samples, a front register of the cascaded shift registers coupled to receive the digital signal and a rear register of the cascaded shift registers coupled to the confirm check module.

\* \* \* \* \*